July 25, 1950 W. I. McCLURE 2,516,713
VEHICLE TOP BOW CLAMP
Filed Sept. 20, 1947
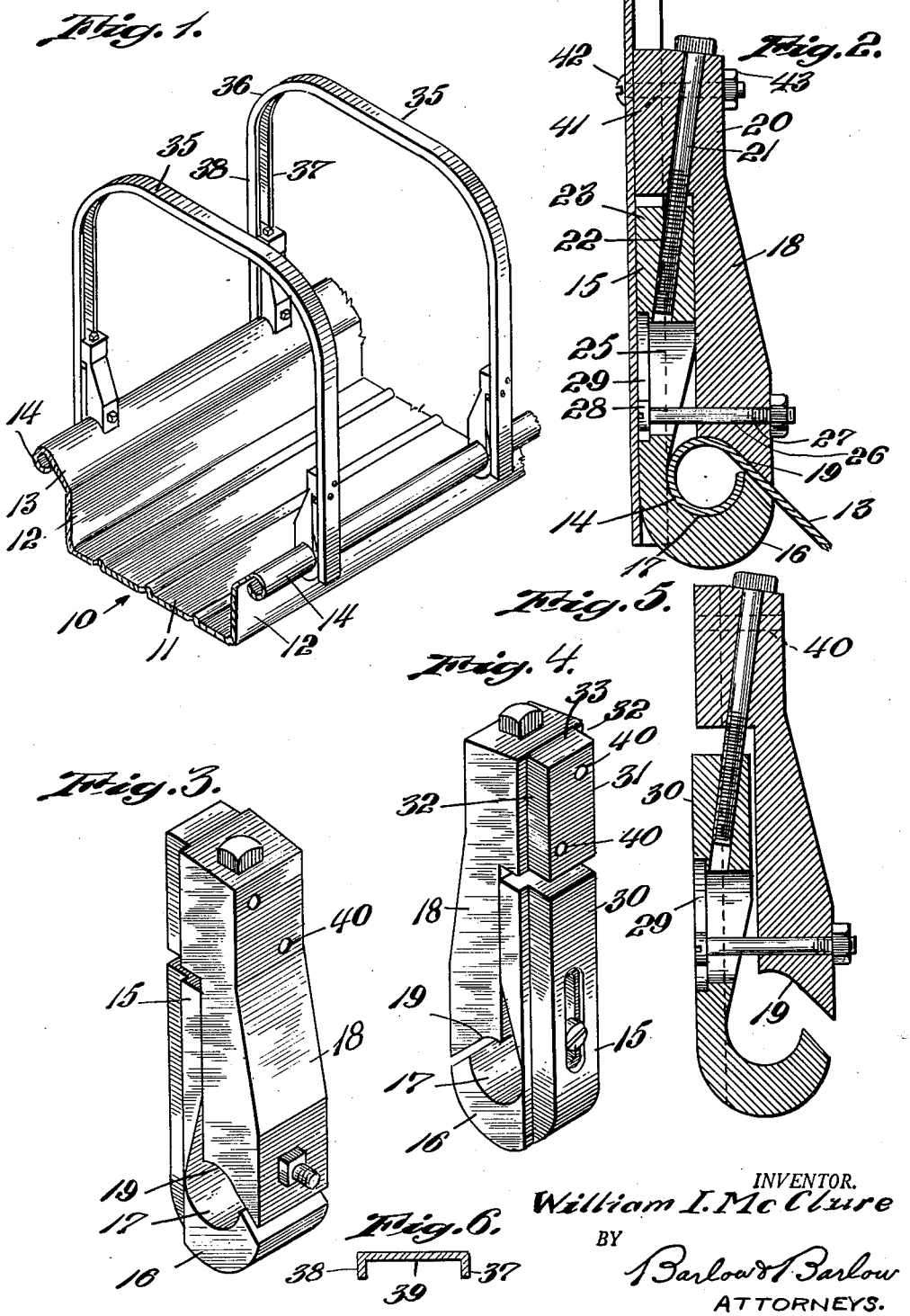
INVENTOR.
William I. McClure
BY
Barlow & Barlow
ATTORNEYS.

UNITED STATES PATENT OFFICE 2,516,713

VEHICLE TOP BOW CLAMP

William I. McClure, Greenwood, R. I., assignor to L. F. Pease Company, a corporation of Rhode Island Application September 20, 1947, Serial No. 775,331

3 Claims. (Cl. 296—104)

This invention relates to a clamp for securing a bow to a truck body, the bow being of a type to support a canvas top or cover or the like.

Truck bodies are usually provided with a flaring flange at the upper edge of each side wall which flange is rolled to strengthen the edge. The arrangement is such that it is difficult to obtain a good grip upon the body for supporting a canvas cover over it. Various ways have been devised, but these usually require drilling into some part of the truck body or some complicated structure which is difficult to use.

One of the objects of this invention is to provide a clamp which will support a channel-shaped bow on the edge of the truck body without the necessity of drilling any holes in the body.

Another object of this invention is to provide a clamp which may be very quickly attached to the truck body.

Another object of this invention is to provide a clamp which may be secured in place by two bolts and which will receive, by the use of two additional bolts, the bow which is to be supported.

Another object of this invention is to provide an extremely simple and yet effective holding clamp.

With these and other objects in view, the invention consists of certain novel features of construction as will be more fully described and particularly pointed out in the appended claims.

In the accompanying drawings:

Fig. 1 is a perspective view of a fragmental portion of a truck body showing my clamps as supporting two bows in place thereon;

Fig. 2 is a central sectional view through the clamp, a fragmental portion of one of the bows and a fragmental portion of the truck body;

Fig. 3 is a perspective view of the clamp with the truck body and bow omitted and looking at one side thereof;

Fig. 4 is a perspective view of the clamp looking at the other side thereof;

Fig. 5 is a central sectional view similar to Fig. 4 but showing the clamp members in separated position;

Fig. 6 is a sectional view of the bow which is to be supported;

In proceeding with this invention, I provide a member which is shaped on its inner side to engage beneath the rim of the truck body and a second member which is shaped to engage the upper edge of the rim with a means to move these members toward each other to grip the rim between them. Means are also provided to prevent lateral separation, while the outer edges of the member are aligned and provide a projection to extend into the channel of the bow to prevent its lateral motion. Bolts may pass through one of the members to prevent relative longitudinal motion of the box and the clamp.

With reference to the drawings, 10 designates the truck body which has the bottom wall 11, side walls 12 with flanges 13 which extend outwardly and are rolled to provide rims 14 extending lengthwise thereof.

The clamp, which is to be secured to the rim, comprises two members, one of these members 15 has an inwardly hook-shaped lower portion 16 to engage the under side of the rolled rim 14 along the curved edge 17. The other of these members 18 has its lower edge 19 of such a shape as to fit the flange 13 and rolled edge of the rim 14, as shown in Fig. 2, and may be moved downwardly by reason of the enlarged upper end 20 receiving a bolt 21 which is screw threaded as at 22 into the upper end 23 of the member 15. Thus, as this bolt is turned, the members 15 and 18 will be moved toward each other to bind the rolled rim 14 between them.

In order to prevent lateral separation of these members 15 and 18, a slot 25 is provided in the member 15 and bolt 26 is located in a bore 27 in the member 18 and is slidable in the slot 26. The head 28 of this bolt is in the recessed portion 29 of the member 15 so as to be below the outer surface 30 thereof, as is clearly shown in the sectional views Figs. 2 and 5 or in Fig. 4 which shows this face.

The aligned surfaces, such as the faces 30 and the face 31 of the members 15 and 18, are recessed as at 32 so as to provide a projection 33 which will extend into the channel of the bow which is to be supported. The bow is designated 35 in Fig. 1 and consists of a channel member bent as at 36 to provide walls 37 and 38 with a bottom 39 joining these (see Fig. 6). The space between the walls 37 and 38 will be substantially the dimension of the projection 33 and bolts may pass through the member 18 and through the holes 40 which are provided therein, one of such bolts is shown in dotted lines (Fig. 2) as at 41 having a head 42 and nut 43. In this way the bow is securely mounted upon the rim and by reason of its construction forms a very rigid support for a canvas cover to be placed over the bows for covering the body of the truck.

I claim:

1. A clamp to attach a bow to a truck body comprising, a member having a hook at one end to engage beneath the rim of the truck body and a shank to extend upwardly therefrom and having an interfitting shape to receive the bow, a second locking member having its end shaped to engage the top of the rim of the truck body and a shank to align with and slidably engage said shank of the other member and having the same interfitting shape to align with the shape of the other shank for receiving said bow, and means engaging both of said members to slide said members lengthwise toward each other to bind the members on the rim of a truck body.

2. A clamp as in claim 1 wherein means are provided to prevent lateral separation of said members.

3. A clamp as in claim 1 wherein a slot is provided in one member and a bolt extends through said slot and the other member to prevent lateral separation of said members.

WILLIAM I. McCLURE.

REFERENCES CITED

The following references are of record in the file of this patent:

UNITED STATES PATENTS

| Number | Name | Date |
|---|---|---|
| 498,593 | Smawley et al. | May 30, 1893 |
| 722,828 | Fergusson | Mar. 17, 1903 |
| 2,259,179 | Sauer | Oct. 14, 1941 |
| 2,262,129 | Andrews et al. | Nov. 11, 1941 |
| 2,333,671 | Peters et al. | Nov. 9, 1943 |
| 2,432,732 | Del Cano | Dec. 16, 1947 |